Feb. 8, 1949.                A. OFFEN                2,461,436
                            CUTTING TOOL
Filed Sept. 10, 1945                         3 Sheets-Sheet 1
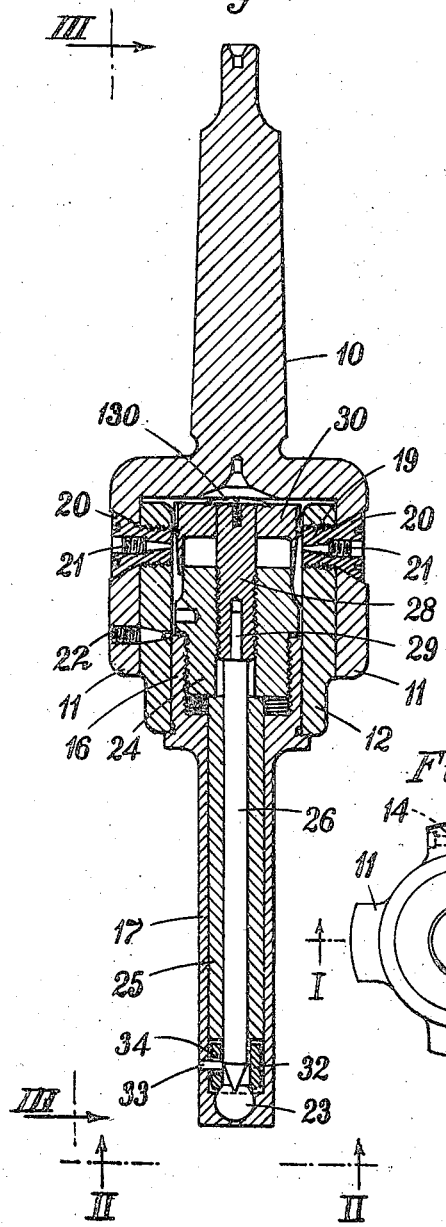
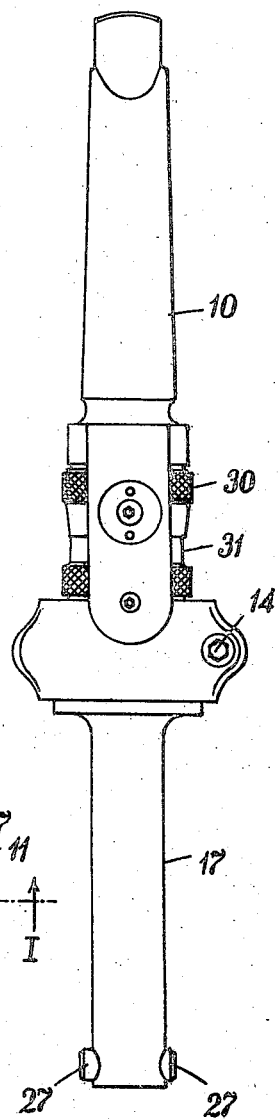
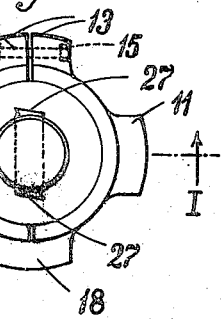
Arthur Offen
Inventor
by his attorneys
Stebbins, Blenko & Webb

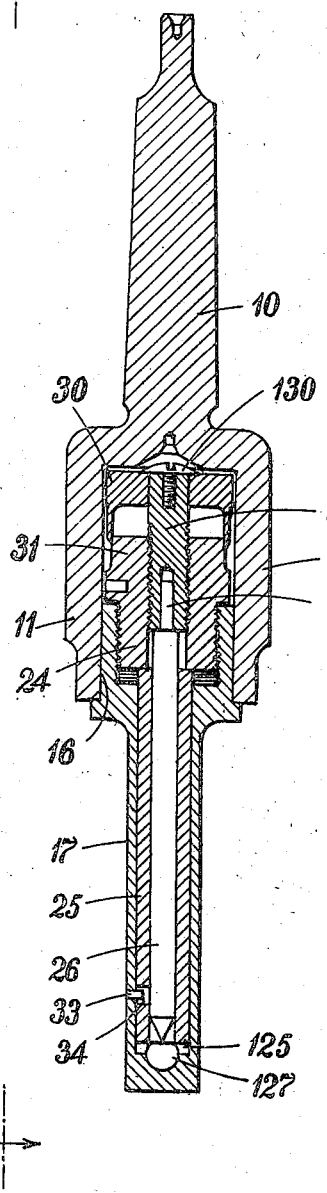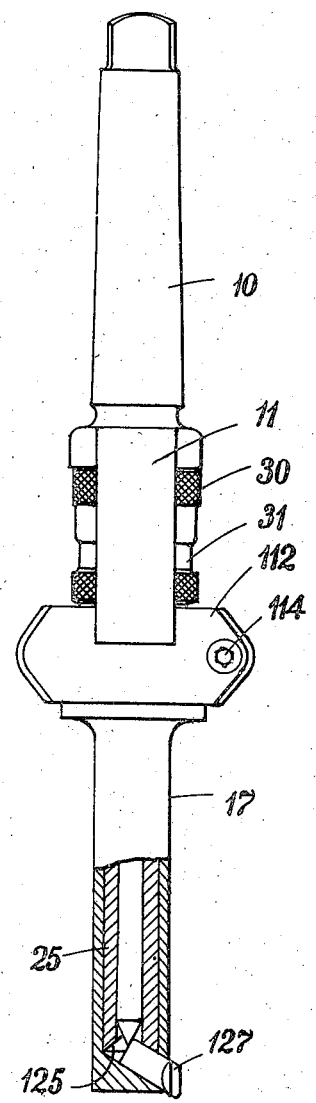

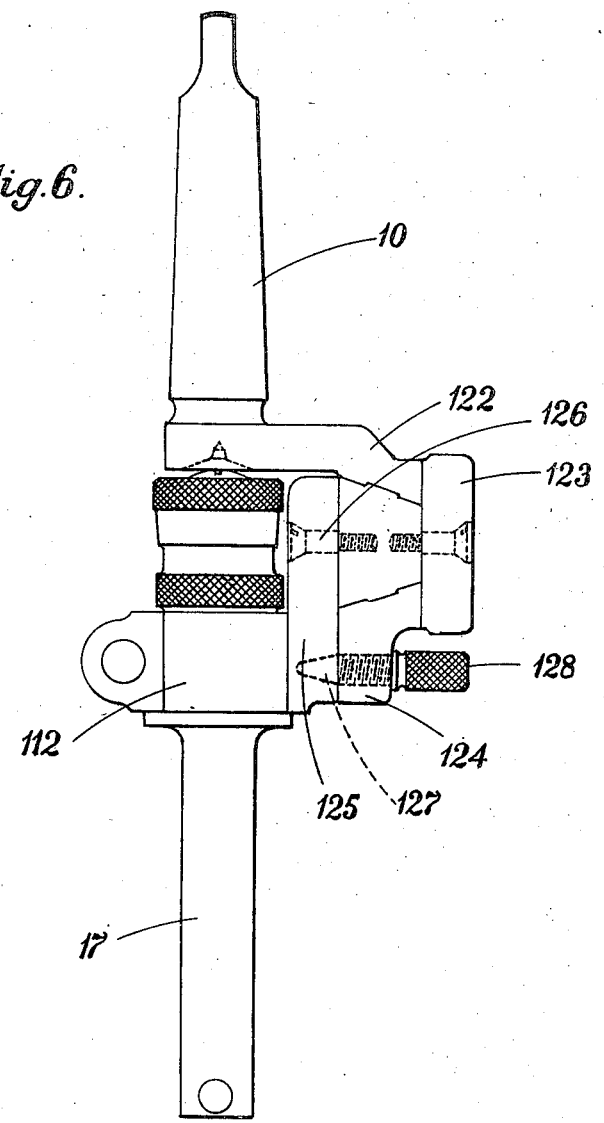

Patented Feb. 8, 1949

2,461,436

UNITED STATES PATENT OFFICE 2,461,436

CUTTING TOOL

Arthur Offen, South Nutfield, England, assignor to Offen & Company Limited, South Nutfield, England, a British company Application September 10, 1945, Serial No. 615,317
In Great Britain November 17, 1944

4 Claims. (Cl. 77—58)

This invention consists in improvements in or relating to boring tools such as cutter bars, reamers and the like.

An object of the present invention is to provide an improved form of boring tool by which the cutter or cutters can be radially adjusted in order to control the size of the hole to be bored or otherwise treated by the boring tool.

An improved tool according to the present invention comprises in combination a tubular cutter bar having a transverse slot at its outer end to receive a cutter within it, a lengthwise adjustable setting rod which cooperates with the cutter to adjust the latter radially of the cutter bar and which extends longitudinally within the sleeve and locking means carried by the tubular cutter bar to engage and hold the cutter in adjusted position. Preferably, the said rod co-operates with the cutter by a wedging action.

The invention further includes a boring tool constructed in the manner just described, but in which the transverse slot in the end of the cutter bar is so formed as to accommodate diametrically opposed cutters which can project laterally beyond the cutter bar on opposite sides thereof.

Conveniently the cutter bar is combined with a holder in which it is received and by which it is rotated.

The outer and inner ends of a tool of this nature are to be considered respectively as the extremity in which the cutting tool is situated and the opposite end thereof.

By such a construction a cutting tool can first be clamped in position and the effective diameter of the cutting edge can then be adjusted by means of the setting rod which by reason of its wedging action can force the cutting tool outwardly to increase the effective diameter against the resistance of the clamping pressure operating through the sleeve to lock the tool in place. The setting rod can be manipulated from a position at the inner end of the tool, that is to say, at a position remote from the cutting tool. The setting rod is conveniently carried by a micrometer head screw-threaded in to the clamping device in order to obtain a fine setting for the tool.

Thus the tool itself may conveniently comprise a tubular cutter bar having the tool-receiving transverse recess at its outer end with its opposite end enlarged to afford a screw-threaded recess in which a clamping nut is received. The clamping tube ground and lapped to fit within the cutter bar is engaged at its outer end by the clamping nut and guides within it the setting rod. The clamping tube is ground and lapped at its two ends to engage the setting rod, the intermediate portion affording a slight clearance between them. Engaged within the inner end of the clamping nut is a screw-threaded spindle of a micrometer head, and this spindle presents an axial recess in which a reduced end of the setting rod is received. The micrometer head overhangs the clamping nut and markings on the head can be read against a setting mark on the clamping nut.

In order to secure the tool within the turning head of a lathe, boring machine or other device by which it is to be rotated the invention includes a tool holder comprising means which can be clamped on to the tool and which affords a taper or other shank to be received in the turning head or its equivalent, the holder being constructed to expose the micrometer head for the setting rod and also preferably to expose the clamping nut which co-operates with the clamping sleeve above described.

In order that the invention may be more clearly understood two preferred examples thereof will now be described with the aid of the accompanying drawings in which—

Figure 1 is a central section in a plane containing the axis of a reamer and is a section on the line I—I of Figure 2, Figure 2 is an end elevation looking in the direction of the arrows II—II of Figure 1, Figure 3 is a side elevation looking in the direction of the arrows III—III of Figure 1, Figure 4 is a section similar to that of Figure 1 illustrating a boring bar constructed in accordance with the invention, Figure 5 is a side elevation looking in the direction of the arrows V—V of Figure 4 and Figure 6 is a side elevation of a modified construction of tool holder.

Like reference numerals indicate like parts in the several figures of the drawings.

In the construction illustrated in Figures 1 to 3 the tool holder comprises a tapered shank 10 terminating in forked arms 11 embracing a split clamping ring 12.

This clamping ring has laterally extending lugs 13 which by means of a bolt 14 and nut 15 can be tightened together so as to close the split clamping ring on to the enlarged inner end 16 of a cutter bar 17. On the opposite side of the diameter from the lugs 13 the split clamping ring is formed with an enlargement 18 in order to balance lugs 13.

The split ring 12 is interconnected with the arms 11 by means of pivoting screws 19 the heads 20 of which are conically formed to seat within the correspondingly formed recesses in the arms 11.

By adjusting the degree to which the cones 20 are screwed down into the arms 11, the freedom of movement of the ring in the arms 11 can be adjusted. The cones are of the split segmental type and are locked in position by means of locking screws 21 the inner extremity of which are tapered and afford a wedging action on the segments of the cones in order to lock the latter in position.

In order to regulate or limit the degree of float to be permitted between the ring 12 and arms 11 a screw 22 is provided, the inner extremity of which is tapered and is received in a tapered recess in the ring 12. Thus by adjusting the screw the amount of play between its tapered extremity and the walls in the recess in which it is received can be accurately adjusted. By releasing screws 19 completely from the clamping ring, the bar can be swung through an arc of approximately 200°.

The cutter bar 17 is of tubular form as illustrated and has at its outer end a transverse tool receiving recess 23. At the inner end of the cutter bar 17 its enlarged end 16 is internally screwthreaded and receives in this screwthreaded recess a correspondingly threaded clamping nut 24. Nut 24 serves to engage the inner end of a clamping sleeve 25 which is ground and lapped to fit within the cutter bar. Within the clamping sleeve is a setting rod 26 which has a tapered extremity to be inserted between two oppositely extending and radially opposed cutting tools 27. Thus by adjusting the setting rod 26 the effective diameter of the combined cutting tools 27 can be accurately adjusted and movement of the setting rod 26 is adjusted by means of a micrometer screw 28 threaded into clamping nut 24. The inner end of the setting rod 26 is formed with a stem 29 of reduced diameter which stem is received and guided in an axial recess in the micrometer screw 28.

A micrometer head 30 is affixed by means of screw 130 to the micrometer screw 28 and it will be appreciated that this micrometer head 30, as shown most clearly in Figure 3 is easily accessible for manipulation. The skirt of the micrometer head overhangs the clamping nut and may be provided with an engraved or other scale by which it can be read against a setting mark on the extension 31 of clamping nut 24, which extension is overhung by the skirt of the micrometer head.

A collar 32 is inserted between the end of clamping sleeve 25 and tools 27 and is of such diameter that it can rock within comparatively small limits within the cutter bar 17. For this purpose the end of the collar which is presented to the clamping sleeve 25 is toroidally formed and is mounted to rock within the cutter bar on a pin 33 extending inwardly from the cutter bar and through a longitudinal slot formed in the collar. The end of the collar which engages the cutters is formed with a flat face at right angles to the axis of the collar.

The dimensions of this slot 34 and of pin 33 are such as to allow not only for a rocking movement of the collar but also for a limited lengthwise adjustment for the purpose of clamping and unclamping the cutting tools. The end of the collar presented to the cuttings tools is shaped more or less toroidally. In order first to set the effective diameter of the cutter, the setting rod and the clamping nut 24 will be slackened to free the cutting tools and they will be moved to the approximately required diameter, whereafter the clamping nut will be tightened so as to lock the cutters either by direct engagement with sleeve 25 or by pressure transmitted through that sleeve to collar 32. As the relatively movable parts comprising the cutters, the end of the clamping sleeve or ring, and the setting rod, are all hardened and polished, the cutters can be moved to their final adjustment without interfering with the setting of the clamping nut at all and even though the pressure derived from the clamping nut is sufficient to lock and hold the cutters during the cutting operation. A fine setting to the cutters can then be obtained by manipulation of micrometer head 30, by means of which setting rod 26 can be forced outwardly thereby adjusting the cutter or cutters outwardly under the control of micrometric adjustment.

If successive cuts of gradually increasing diameter are to be made, it will only be necessary after the first setting to manipulate the micrometer head in order to expand the cutting diameter to the two to the predetermined successive limits.

Clamping sleeve 25 is preferably only ground and lapped at its two ends, the intermediate portion affording a slight clearance between the clamping sleeve and the cutter bar.

The tapered shank 10 serves for securing the tool within the turning head of the machine in which it is to be employed.

It is found in practice that a floating cutter of this sort has a particular advantage for reaming operations particularly in high speed production work. Hitherto a floating tool has been provided which has necessitated considerable complication in the construction of the outer end of the cutter bar in order to provide for the satisfactory clamping and setting of the cutting tools. The present invention, however, is of a comparatively simple character and allows for a certain degree of floating play for the reamer in a thoroughly satisfactory manner.

Figures 4 and 5 illustrate a boring bair which, in the main essentials is similar to that of the reamer except that in this case the bar itself does not float. As in the previous example the tool holder comprises a tapered shank 10 terminating in forked arms 11, and in this case these arms 11 terminate in a split clamping ring formed integrally with the outer ends of the forks 11. In order to distinguish this clamping ring from that of the previous example it is designated by the reference numeral 112, and the lugs of the clamping ring are tightened together by means of a nut and bolt of which the bolt is designated by the reference numeral 114 and corresponds to that of the reference numeral 14 of the previous example. The cutter bar 17 has, as before, an enlarged head 16 on to which the clamping ring is tightened and within the cutter bar is a clamping sleeve 25 receiving within it a setting rod 26. As before there is also a clamping nut 24 screw-threaded into the enlarged head 16 of the cutter bar so as to engage the inner end of sleeve 25, and the end 31 of the clamping nut 24 co-operates in a similar manner with a micrometer head 30 secured to a micrometer screw 28 which embraces a reduced stem 29 formed on the inner end of setting rod 26. A screw 130 serves to secure the micrometer head to the micrometer screw.

A single cutting tool 127 is employed in this case and is received in the cutter bar in a transverse hole inclined as shown relatively to the axis of the cutter. The inner end of the tool 127 cooperates to provide a wedging action with the tapered extremity of the setting rod 26 and by outward movement of the latter the tool 127 can be forced outwardly from the cutter bar. The outer extremity of the clamping tube 25 is shaped as shown at 125 to grip firmly on to the tool 127. A longitudinal slot 34 in the clamping tube 25 is engaged by a pin 33 fixed in the cutter bar 17 in order to limit movement of the clamping sleeve and also to prevent rotation of the latter.

In Figure 6 a modified form of tool holder is illustrated in which a cranked mounting for the latter is afforded. For this purpose the tapered shank 10 is connected to the split clamping ring 112 by means of a cranked connection 122, 123, 124. An extension 125 forming part of the split clamping ring 112 is pivotally mounted by means of a screw 126 on the part 123 and affords a float between the cutter bar 17 and the shank 10. The degree of float is limited by means of the tapered end 127 of an adjusting screw 128, the end 127 taking into a conical recess formed in the part 125.

This cranked tool holder can be used either with a boring bar or a reamer and it may be mentioned also that in the case of the boring bar illustrated in Figures 4 and 5 a floating interconnection between the cutter bar 17 and the shank 10 may also be employed if desired.

In all constructions thorough access is afforded in the micrometer head which, as it is located at the rear or inner end of the cutter bar leaves the working end of the bar free from any sliding part, the operation of which can be interfered with by scrap metal or cutting fluid.

The diameter of the working end of the bar can be made smaller for a given cutting or working diameter as compared with cutting tools in which sliding cutters are employed thereby allowing a greater clearance for chips.

The method of adjusting and clamping the cutting blades is simple, substantial, and economic to produce and at the same time provides exceptionally fine adjustment for the cutting blades. The divisions on the micrometer head are large and can easily be provided to represent increases in diameter of 0.0002".

The cutting blades can be changed rapidly without involving the removal and replacement of any other part of the bar.

Other advantages of the invention are that the normal cutting blades used in the bars allow boring or reaming to be carried to within a very small distance from the bottom of a dead hole; and by the use of stepped cutter blades, it is possible to ream dead holes right to the bottom.

Hole diameters of ¼" or less can be bored or reamed, whereas floating cutter type reamers at present on the market do not ream below ¾" diameter.

In the reamer, the head into which the cutter bar is clamped, embodies a pivot on which it floats. This pivot is provided with an adjustment, by means of which the ease of float can be varied to suit the characteristics of the material being reamed, and varying diameters of holes.

Means are also provided for limiting the amount of float, and for locking the bar rigidly, or releasing it so that it can be swung through an arc of 200°. The complete reamer is balanced, and can be used equally well for reaming with either the work or the tool rotating.

I claim:

1. A boring-tool comprising the combination of a tubular cutter-bar having a transverse slot at its outer end to accommodate within it a substantially radially projecting and adjustable cutter and terminating at its inner end in a screw-threaded recess, locking-means for the cutter comprising an axially movable sleeve located within the cutter-bar with its outer end presented to the slot in which the cutter is received to be operatively engaged at its outer end with the cutter, a clamping-nut threaded into said recess to engage the inner end of the sleeve, an endwise movable setting-rod extending longitudinally within the sleeve to engage the cutter and a micrometer-head in axial alignment with and in screw-threaded engagement with the clamping-nut, a part of said micrometer-head engaging the inner end of the setting-rod to move it at least in a direction towards the cutter.

2. A boring-tool comprising the combination of a tubular cutter-bar having a transverse slot at its outer end to accommodate within it a radially projecting and adjustable cutter, cutter locking-means comprising an axially movable sleeve located within the cutter-bar with its outer end presented to the slot in which the cutter is received, an endwise movable setting-rod extending longitudinally within the sleeve to engage the cutter, means to adjust the setting-rod endwise in order to set the cutter radially, a collar interposed between the outer end of the sleeve and the cutter, a clamping-device by which the sleeve can be moved at least towards the cutter to lock it by pressure applied through the intermediate collar, said collar having that end which is presented to the cutter toroidally shaped and provided with a slot formed in the side wall of the sleeve, and a pin extending inwardly from the cutter-bar through the slot in the collar permitting the collar to rock on the pin within the cutter bar, the external diameter of the collar being such as to permit of the required degree of rocking.

3. A boring-tool according to claim 1, combined with a holder in which the tool is received and by which it is rotated, the said holder being constructed to expose the clamping-device for locking the cutters, a pivot mounting in said holder for the tool having its pivotal axis transverse to the axis of the tool, and means to limit the degree of pivotal movement between the tool and the cutter-bar.

4. A boring-tool according to claim 2, combined with a holder in which the tool is received and by which it is rotated, the said holder being constructed to expose the clamping-device for locking the cutters, a pivot mounting in said holder for the tool having its pivotal axis transverse to the axis of the tool, and means to limit the degree of pivotal movement between the tool and the cutter-bar.

ARTHUR OFFEN.

REFERENCES CITED

The following references are of record in the file of this patent:

UNITED STATES PATENTS

| Number | Name | Date |
|---|---|---|
| 981,520 | Tully | Jan. 10, 1911 |
| 1,409,379 | Hunziker | Mar. 14, 1922 |
| 1,637,611 | Hiscock | Aug. 2, 1927 |
| 1,774,701 | Davenport | Sept. 2, 1930 |
| 1,797,582 | McClay | Mar. 24, 1931 |
| 2,369,875 | Wanelik | Feb. 20, 1945 |